United States Patent [19]

Papenhagen et al.

[11] Patent Number: 4,457,189

[45] Date of Patent: Jul. 3, 1984

[54] LINKAGE FOR OPERATING A CONTROL ELEMENT OF AN INTERNAL COMBUSTION ENGINE

[75] Inventors: Dieter Papenhagen, Backnang-Heiningen; Henning Wallentowitz, Aichwald; Gerhard Lepler, Wolfschlugen; Martin Hampp, Nagold, all of Fed. Rep. of Germany

[73] Assignee: Daimler-Benz Aktiengesellschaft, Stuttgart, Fed. Rep. of Germany

[21] Appl. No.: 293,504

[22] Filed: Aug. 17, 1981

[30] Foreign Application Priority Data

Aug. 16, 1980 [DE] Fed. Rep. of Germany ....... 3031035

[51] Int. Cl.³ ............................................. G05G 1/14
[52] U.S. Cl. ..................................................... 74/513
[58] Field of Search .................. 74/512, 513; 248/659; 180/315

[56] References Cited

U.S. PATENT DOCUMENTS

| | | | |
|---|---|---|---|
| 2,040,035 | 5/1936 | Trott | 180/315 X |
| 2,836,076 | 5/1958 | Koehler et al. | 74/513 X |
| 2,884,804 | 5/1959 | Muller | 74/513 |
| 3,218,881 | 11/1965 | Cairns | 74/513 |
| 3,304,498 | 2/1967 | Puidokas | 74/513 |

*Primary Examiner*—Leslie A. Braun
*Assistant Examiner*—Frank H. McKenzie, Jr.
*Attorney, Agent, or Firm*—Craig & Burns

[57] ABSTRACT

A linkage for operating a control element of an internal combustion engine is constructed in a manner such that a change in the inclination of the position of the internal combustion engine has no effect, or merely an intentional, minor effect on the relative position of a linkage operated control element for the internal combustion engine. In accordance with a first embodiment, by appropriately dimensioning and positioning a regulating lever along the longitudinal shaft directly operating the control element, rotation of the longitudinal shaft, during inclination of the engine, is matched, or caused to differ by a predetermined amount, so as to maintain a desired relationship between the position of the control element relative to the engine. In accordance with a second embodiment, a resilient elastic element that is torsionally rigid, but otherwise resilient is interconnected with the longitudinal shaft in a manner to cause the rotation of the shaft to match or differ by a predetermined amount from the angle of inclination of the engine so as to maintain the desired positional relationship between the control element and the engine.

5 Claims, 2 Drawing Figures

LINKAGE FOR OPERATING A CONTROL ELEMENT OF AN INTERNAL COMBUSTION ENGINE

The present invention relates to a linkage for operating a control element of an internal combustion engine, and more particularly, to a linkage arrangement for enabling the actuation of the throttle valve of an internal combustion engine that is resiliently mounted with respect to the automobile body and is inclined under load about a longitudinal axis, the throttle valve being actuatable by a shaft extending longitudinally with respect to the vehicle and in turn being operable by a lever connected on the one hand, fixedly to the longitudinal shaft, and on the other hand, via an articulated linkage with an operating member.

A linkage has been disclosed (West German Patent Application No. P 29 31 914.9, corresponding to commonly assigned U.S. Application Ser. No. 176,204, filed Aug. 7, 1980) now abandoned wherein a longitudinal shaft can be prevented from rotation, in the event of a change in the inclination of an internal combustion engine, by the longitudinal shaft of the linkage leading to the operating member being connected to a wall of the vehicle body by an elastic member that is rigid under torsional movement, but very soft with respect to axial and angular movement. While such a linkage can enable the control element of an internal combustion engine, for example, a throttle valve or a control rod, to avoid problems associated with resilient movements of the engine, it is also possible for the throttle valve or control rod to be displaced relative to the internal combustion engine, resulting in turn, in a change of the load condition. Thus, acceleration jerks can possibly arise which are unpleasant for the occupants of the vehicle and harmful to the vehicle.

Accordingly, it is an object of the present invention to construct a linkage in such a manner that a change in the inclination position of the internal combustion engine has no effect, or merely an intentional minor effect on the relative position of the internal combustion engine and control element, as it may be desired, for example, to compensate for elasticities in the power train of the internal combustion engine.

German Pat. No. 933,245 and Austrian Pat. No. 189,508, disclose linkages that enable acceleration jerking to be eliminated. However, in linkages of the type disclosed in these patents, push rods are utilized as a connection between the car body and the internal combustion engine and result in expensive solutions to the above-noted problem.

Thus, it is a further object of the present invention to provide a solution to the linkage problems associated with resilient mounting of an engine that is simple and inexpensive.

These objects have been attained in accordance with the preferred embodiments of the present invention wherein the positioning of the regulating lever along the length of the longitudinal shaft and its length between the connection thereof to the longitudinal shaft and its point of articulation to the linkage leading to the operating member are selected so that, with an inclination of the internal combustion engine about a longitudinal axis via a certain angle, the regulating lever will execute a pivoting motion about the point of articulation by approximately the same angle. By making the spacing of the regulating lever along the longitudinal shaft relative to the bearing of the longitudinal shaft at the motor vehicle body approximately one-fourth of the length of the longitudinal shaft, a length of the regulating lever can be advantageously incorporated into the arrangement and the motion processes of the linkage.

In accordance with a preferred aspect of the invention, a simple manner of adjusting the position and movements of the regulating lever is achieved when a tie rod joins the point of articulation of the regulating lever and is connected to a guide lever that is rotatively supported in a vehicle body part.

In accordance with a modified embodiment, the longitudinal shaft is supported at its vehicle supported end so as to be rotatable and pivotable in a torsionally rigid and otherwise resilient elastic element that is rotatively supported on the vehicle body part and connected, to the operating member actuated linkage components, whereby transmission of vibrations emanating from the internal combustion engine to the car body in the operating member are avoided.

These and other objects, features and advantages of the present invention will become more apparent from the following description when taken in connection with the accompanying drawings which show, for the purposes of illustration only, several embodiments in accordance with the present invention and wherein:

DETAILED DESCRIPTION OF THE PREFERRED EMBODIMENT

Figures 1, 2:
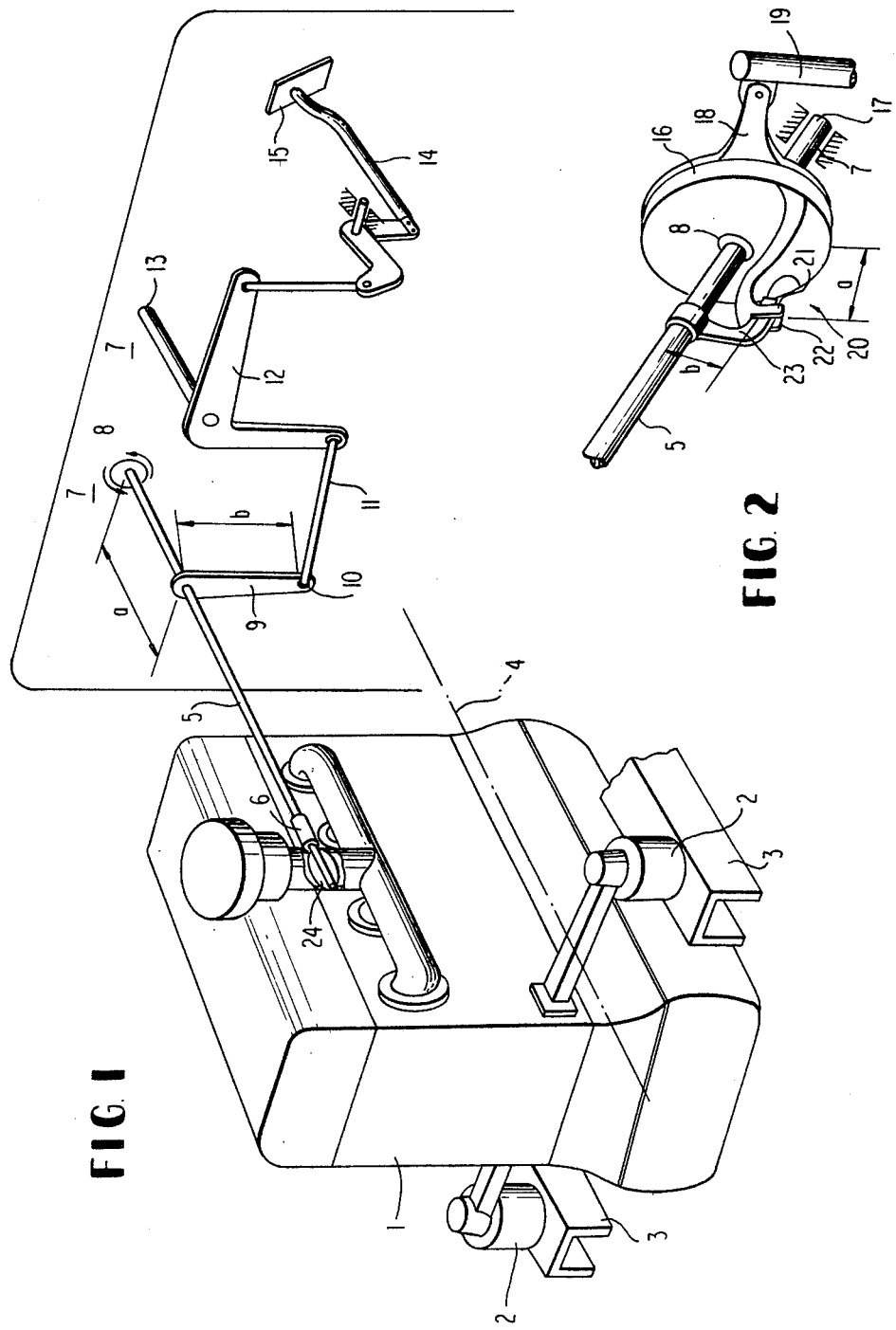
FIG. 1 is a schemaic illustration of a resiliently mounted engine connected to a linkage in accordance with a first embodiment of the present invention.
FIG. 2 is a partial schematic illustration of a modified portion of a linkage in accordance with the present invention.

With reference to FIG. 1, an internal combustion engine 1 is shown resiliently supported by elastic bearings 2 upon the body frame 3 of an automotive vehicle. When load changes occur, the internal combustion engine 1 changes in inclination about a longitudinal axis 4 due to the resilient support provided by the bearings 2. At a point above the longitudinal axis 4, a longitudinal shaft 5 is arranged. A longitudinal shaft conventionally operates a control element, for example, a throttle valve 24 or a control rod of an injection pump, and is rotatably supported within a bearing 6. The longitudinal shaft 5 extends in the longitudinal direction of the internal combustion engine 1 from the control element 24 to an end wall of the motor vehicle body 7 wherein the longitudinal shaft 5 is mounted in a manner which enables it to rotate about its longitudinal axis and so as to be pivotable by means of bearing 8.

For actuation of the longitudinal shaft, a regulating lever 9 is fixedly connected thereto at a spacing a approximately one-fourth of the distance along the longitudinal shaft from the bearing 8 toward the control element 24. The regulating lever 9 projects downwardly, i.e., in a direction toward the longitudinal axis 4, and at a lever length b at the lower end of the regulating lever 9, a tie rod 11 is connected in a point of articulation 10. The tie rod 11 extends approximately horizontally from the point of articulation 10 to a guide lever 12 to which its opposite end is articulated. The guide lever 12 is supported in the end wall 7 through the aid of a bearing 13 and is shifted about the bearing 13 by way of a push rod 14 and an operating member 15, such as an accelerator pedal. When the operating member 15 is actuated, the position of the throttle member 24 is adjusted and the load on the internal combustion engine 1 is altered. When the load on the engine is altered, the engine is caused to incline by a certain angle about the longitudinal axis 4 relative to the body. Since the bearing 6, through which longitudinal shaft 5 passes, also participates in this movement at the engine 1, the longitudinal shaft is laterally pivoted about the bearing 8 in the end wall 7. Since the regulating lever 9 is fixedly connected to the longitudinal shaft 5 at its upper end, its upper end shifts laterally with the longitudinal shaft 5. On the other hand, due to the connection of the lower end of lever 9 with tie rod 11, the lower end of the regulating lever 9 does not shift laterally with the result that the regulating lever 9 executes a pivotal motion about the point of articulation 10, whereby the longitudinal shaft 5 is rotated relative to the end wall 7.

The pivoting angle of the regulating lever 9 and the angle of rotation of the longitudinal shaft 5 are identical. If the lever length b of the regulating lever 9 is about one-forth of the distance of the bearing 6 from the longitudinal axis 4, then the pivoting angle of the regulating lever 9 (and thus the angle of rotation of the longitudinal shaft 5) is approximately equal to the angle of inclination of the internal combustion engine 1; consequently, the longitudinal shaft 5 executes little or no rotational movement at all with respect to the internal combustion engine. Thus, the position of the control member relative to the internal combustion engine 1 remains essentially unchanged as well and thus acceleration is not affected.

While it is possible by means of the illustrated arrangement to completely prevent inclination movements of the internal combustion engine 1 from having any influence upon the position of the control element 24, it may be desireable to retain this dependency to a certain extent, for example to compensate for dynamic effects upon the internal combustion engine 1 which can result from the elasticity of the power train of the automotive vehicle. With the aid of the disclosed arrangement, these effects can likewise be completely considered and compensated for.

In accordance with a second embodiment of the present invention, as illustrated in FIG. 2, the longitudinal shaft 5 (shown only in part) is supported to be rotatable and pivotable in a rotationally rigid, but otherwise resilient, approximately disc-shaped elastic element 16, which is fixedly connected to a stub shaft 17, the stub shaft 17 being rotatively mounted in the end wall 7. The element 16 is fixedly connected at its side facing end wall 7 with a lever 18 to which is articulated a push rod 19 that forms a part of a linkage leading to the operating member 15 (not shown in this embodiment). The element 16 is also connected, at its opposite side facing the engine 1, to a lever 20 that terminates at the distance a from the element 16 at a point a spacing b below the longitudinal shaft 5 in a direction toward the longitudinal axis 4. At this point, the end of the lever 20 is provided with an entrainment means 21 having a vertically oriented slot 22 within which is received the flat end of the regulating lever 23 that is fixedly joined to the longitudinal shaft 5.

In the event of a change in the inclination of the internal combustion engine, the longitudinal shaft 5 is pivoted about its bearing in the elastic element 16 in a manner anaglous to that described above with respect to the first embodiment. Since the bearing 16 is torsionally rigid, but otherwise resilient, as was the case with lever 9, the connection of regulating lever 23 with the entraining means 21 of the lever 20 prevents lateral shifting of the end of the regulating lever 23 received within the entraining means 21, whereby the longitudinal shaft 5 is caused to execute a rotational movement relative to the body. Again, the size of the angle of rotation of the shaft 5 can be caused to match or differ by a predetermined amount, the inclination of the engine 1, by corresponding selection of the spacings a and b.

The slight rotational movement which the regulating lever 23 undergoes in the slot 22 is enabled by a thin layer of elastic material which is applied to the entraining means 21 in the slot 22 and simultaneously ensures a playfree and low-noise-level coupling between the regulating lever 23 and the entraining means 21.

From the foregoing, it should be readily evident that the present invention provides a simple and economical means for avoiding acceleration jerks resulting from inclination of the resiliently mounted engine under changes of loading.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A linkage assembly for operating a control element of an internal combustion engine that is resiliently mounted with respect to a body of an automobile so as to incline under load about a longitudinal axis of the automobile comprising a longitudinal shaft installed in parallel to said longitudinal axis of the automobile, said shaft being mounted above said longitudinal axis, with one end connected to the internal combustion engine and an opposite end connected to the body of the automobile by a bearing, in a rotatable and pivotable fashion, and a regulating lever operated by an operating member, said regulating lever being fixedly connected at one end of the longitudinal shaft and articulated to a linkage leading to an operating member at a second end, wherein the connection of the regulating lever to the longitudinal shaft is spaced a first predetermined distance with respect to said bearing;

and the regulating lever has a length defining a second predetermined distance measured by the length between the second end of the regulating lever and the longitudinal shaft;

and that the second end of the regulating lever, when the operating member is stationary, is held laterally immovably below the longitudinal shaft;

and the first predetermined distance and said second predetermined distance from the articulation of the second end of the regulating lever to the longitudinal shaft are dimensioned whereby, with an inclination of the internal combustion engine about the longitudinal axis of the automobile by a certain angle, the regulating lever executes a pivoting motion about the articulation by an approximately equal angle, so that a control element of the engine which is actuated by the longitudinal shaft is essentially always at a desired positional relationship with respect to the engine.

2. The linkage assembly according to claim 1, wherein
the first predetermined distance between the bearing and fixed connection of the regulating lever to the shaft is about one-fourth of the length of the longitudinal shaft from the bearing to the engine.

3. The linkage assembly according to claim 1 or 2, wherein a tie rod is connected to the second end of the regulating lever at a point of articulation, said tie rod being connected to a guide lever that is rotatably supported in a vehicle body part.

4. The linkage assembly according to claim 1 or 2, wherein said bearing comprises an elastic element supporting the longitudinal shaft so as to be rotatable and pivotable in a torsionally rigid but otherwise resilient manner, the elastic element being rotatably supported in a vehicle body part and being connected on a side facing the vehicle body part with linkage components leading to the operating member, a lever being connected to the elastic element on a side facing the longitudinal shaft, the lever having an entrainment means receiving the second end of the regulating lever at said spacing from the longitudinal shaft.

5. The linkage assembly according to claim 1 or 2, wherein
said second predetermined distance is one-fourth the distance from the longitudinal shaft to said longitudinal axis.

* * * * *